(12) United States Patent
Kiyota et al.

(10) Patent No.: US 7,796,846 B2
(45) Date of Patent: Sep. 14, 2010

(54) OPTICAL INTEGRATED DEVICE AND METHOD OF MANUFACTURING THE SAME

(75) Inventors: Kazuaki Kiyota, Tokyo (JP); Masaki Funabashi, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 18 days.

(21) Appl. No.: 12/320,031

(22) Filed: Jan. 15, 2009

(65) Prior Publication Data

US 2009/0185774 A1    Jul. 23, 2009

(30) Foreign Application Priority Data

Jan. 17, 2008  (JP) .............. 2008-008210

(51) Int. Cl.
  *G02B 6/12* (2006.01)
(52) U.S. Cl. ........................ 385/14; 385/129
(58) Field of Classification Search .............. 385/14, 385/129–132; 430/321
  See application file for complete search history.

(56) References Cited

U.S. PATENT DOCUMENTS 6,493,477 B2 * 12/2002 Onoe ........................ 385/14
2003/0169965 A1 * 9/2003 Hanada ..................... 385/29
2006/0233486 A1 * 10/2006 Faccio et al. ............... 385/14
2007/0086699 A1 * 4/2007 Doerr ........................ 385/24
2007/0287212 A1 * 12/2007 Maxwell et al. ............ 438/31

FOREIGN PATENT DOCUMENTS

JP        2003-207665        7/2003

* cited by examiner

*Primary Examiner*—Ellen Kim
(74) *Attorney, Agent, or Firm*—Kubotera & Associates LLC

(57) ABSTRACT

An optical integrated device comprises a substrate and a waveguide formed on a surface of the substrate. The waveguide includes a lower clad layer, a core layer formed on the lower clad layer and having a refractive index greater than that of the lower clad layer, and an upper clad layer formed on the core layer and having a refractive index smaller than that of the core layer. The waveguide further includes a straight waveguide part and a bending waveguide part curved in a plane parallel to the surface of the substrate. The lower clad layer in the bending waveguide part projects from the substrate by a projection height greater than that of the lower clad layer in the straight waveguide part.

6 Claims, 19 Drawing Sheets

OPTICAL INTEGRATED DEVICE AND METHOD OF MANUFACTURING THE SAME

CROSS-REFERENCE TO RELATED APPLICATIONS

This application claims priority from a Japanese patent application No. 2008-8210 filed on Jan. 17, 2008, the entire content of which is incorporated herein by reference.

BACKGROUND OF THE INVENTION

1. Field of the Invention

The present invention relates to an optical integrated device primarily used in optical communication, and a method of manufacturing the optical integrated device.

2. Description of the Related Art

With advancement of optical communication technique, there has been a growing demand for high performance, downsizing, and low power consumption of an optical device. An optical integrated device, in which optical devices are highly integrated, is expected to be a solution to such a demand.

A deep ridge waveguide is expected to be a waveguide structure of an optical integrated device using a semiconductor (refer to Patent Reference). FIG. 32 is a cross sectional view schematically showing a structure of a conventional deep ridge waveguide.

Patent Reference: Japanese patent publication No. 2003-207665

As shown in FIG. 32, the deep ridge waveguide has a structure, in which a lower clad layer 71, formed as a portion of a substrate 70 projecting from a surface of the substrate 70 by a projection height d5 and extending along the surface of the substrate 70, a core layer 72, and an upper clad layer 73 are sequentially formed in this order on the substrate 70. A refractive index of the core layer 72 is greater than those of the lower clad layer 71 and the upper clad layer 73, and extremely greater than that of the air. Accordingly, light propagating in the core layer 72 is confined due to a difference in the refractive indexes between the core layer 72 and the lower clad layer 71 or the upper clad layer 73 in a thickness direction, and further due to a large difference in the refractive indexes between the core layer 72 and the air in a lateral direction.

The structure can be formed through sequentially growing the core layer 72 and the upper clad layer 73 on the substrate 70, and thereafter etching to a depth reaching the substrate 70, to leave the portion to be the waveguide.

It is preferable that the waveguide of the optical integrated device is a single mode waveguide for allowing light to propagate only in a fundamental mode. When a deep ridge waveguide formed of a semiconductor is designed to be a complete single mode waveguide, a width of the waveguide (mesa width) needs to be far less than 1 μm, thereby making it difficult to produce the waveguide. Therefore, in an actual design, the mesa width is often set to around 2 μm, thereby allowing the waveguide to be a multimode waveguide in which some higher order modes can propagate.

Patent Reference has disclosed a design to suppress light propagation in higher order modes for a deep ridge waveguide having a mesa width with which the waveguide acts as a multimode waveguide. In the deep ridge waveguide, the core layer and the upper and lower clad layers are configured such that a mode refractive index of a fundamental mode is greater than a refractive index of the substrate, and a mode refractive index of higher order modes is less than the refractive index of the substrate. Further, the projection height of the lower clad layer from the substrate is small. Accordingly, the higher order mode light can be attenuated by being radiated into the substrate, and therefore the light propagation in higher order modes can be restrained.

In the optical integrated device, in order to properly connect each component of the optical integrated device, it is necessary to use not only a straight waveguide but also a bending waveguide curved along a surface of the substrate. However, in the bending waveguide designed to suppress light propagation in higher order modes, an excessive propagation loss (bending propagation loss) of the fundamental mode occurs due to the bending.

A relation between a radius of the curvature of the bending waveguide and the bending propagation loss of the fundamental mode will be explained below. An electromagnetic field simulation is performed for the deep ridge waveguide designed such that the higher order mode light is radiated into the substrate as disclosed in Patent Reference.

In the simulation, a thickness of the core layer is set to 0.30 μm, a projection height of the lower clad layer from the substrate is set to 0.5 μm, a thickness of the upper clad layer is set to 2.50 μm, and the mesa width is set to 2.0 μm. Further, a refractive index of the core layer is set to 3.31, a refractive index of the upper clad layer and the lower clad layer is set to 3.17, and a refractive index of the medium (air) around the mesa structure is set to 1.00. Under such design parameters, a mode refractive index of the fundamental mode in the waveguide is greater than the refractive index of the substrate, and a mode refractive index of higher order modes is less than the refractive index of the substrate, whereby the higher order mode light is radiated into the substrate.

FIG. 33 shows a result of the calculation of the bending propagation loss of the fundamental mode as a function of a radius of the curvature in the conventional deep ridge waveguide. As shown in FIG. 33, in the conventional deep ridge waveguide, the bending propagation loss increases exponentially with a decrease in the radius of the curvature for both the TE mode and the TM mode. The bending propagation loss is 2 dB/mm in the case of the radius of the curvature of 200 μm, and reaches as large as 8 dB/mm for the case of the radius of the curvature of 100 μm.

As described above, in the deep ridge waveguide designed such that the higher order mode light is radiated, the bending propagation loss of the fundamental mode is not negligible. The bending propagation loss becomes extremely great when the radius of the curvature is small, thereby making it difficult to downsize or highly integrate an optical integrated device.

SUMMARY OF THE INVENTION

It is an object of the present invention to at least partially solve the problems in the conventional technology.

According to a first aspect of the present invention, an optical integrated device comprises a substrate and a waveguide formed on a surface of the substrate. The waveguide includes a lower clad layer, a core layer formed on the lower clad layer and having a refractive index greater than that of the lower clad layer, and an upper clad layer formed on the core layer and having a refractive index smaller than that of the core layer. The waveguide further includes a straight waveguide part and a bending waveguide part curved in a plane parallel to the surface of the substrate.

The lower clad layer in the bending waveguide part projects from the substrate by a projection height greater than that of the lower clad layer in the straight waveguide part.

According to a second aspect of the present invention, a method of manufacturing an optical integrated device comprises the steps of:

laminating sequentially on a substrate at least a core layer having a refractive index greater than that of the substrate and an upper clad layer having a refractive index smaller than that of the core layer in this order to form a lamination structure;

forming a mask pattern on the lamination structure, said mask pattern including a waveguide mask pattern having a straight part and a bending part, said mask pattern further including a support mesa mask pattern in a region apart from the waveguide mask pattern on both lateral sides thereof, said support mesa mask pattern being away from the bending part by a distance larger than that of the support mesa mask pattern away from the straight part; and dry-etching the lamination structure to a depth reaching inside the substrate to form a waveguide beneath the waveguide mask pattern and a support mesa beneath the support mesa mask pattern so that that the waveguide around the bending part has an etching depth in the substrate greater than that of the waveguide around the straight part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention will be explained in detail below with reference to the drawings. The present invention is not limited to the embodiments.

First Embodiment

A first embodiment of the present invention will be described below. An optical integrated device according to the first embodiment is configured as a Mach-Zehnder type optical switch which operates within a 1.55 µm wavelength band.

Figure 1:
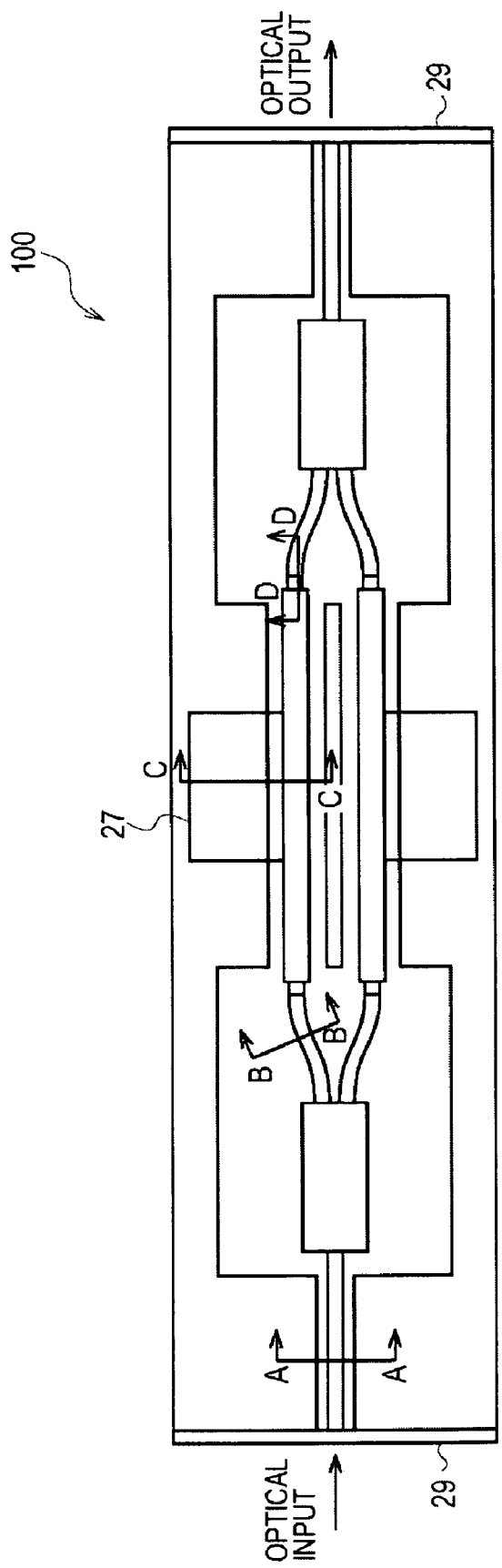
FIG. 1 is a schematic plan view showing an optical switch according to a first embodiment of the present invention.
Figure 2:
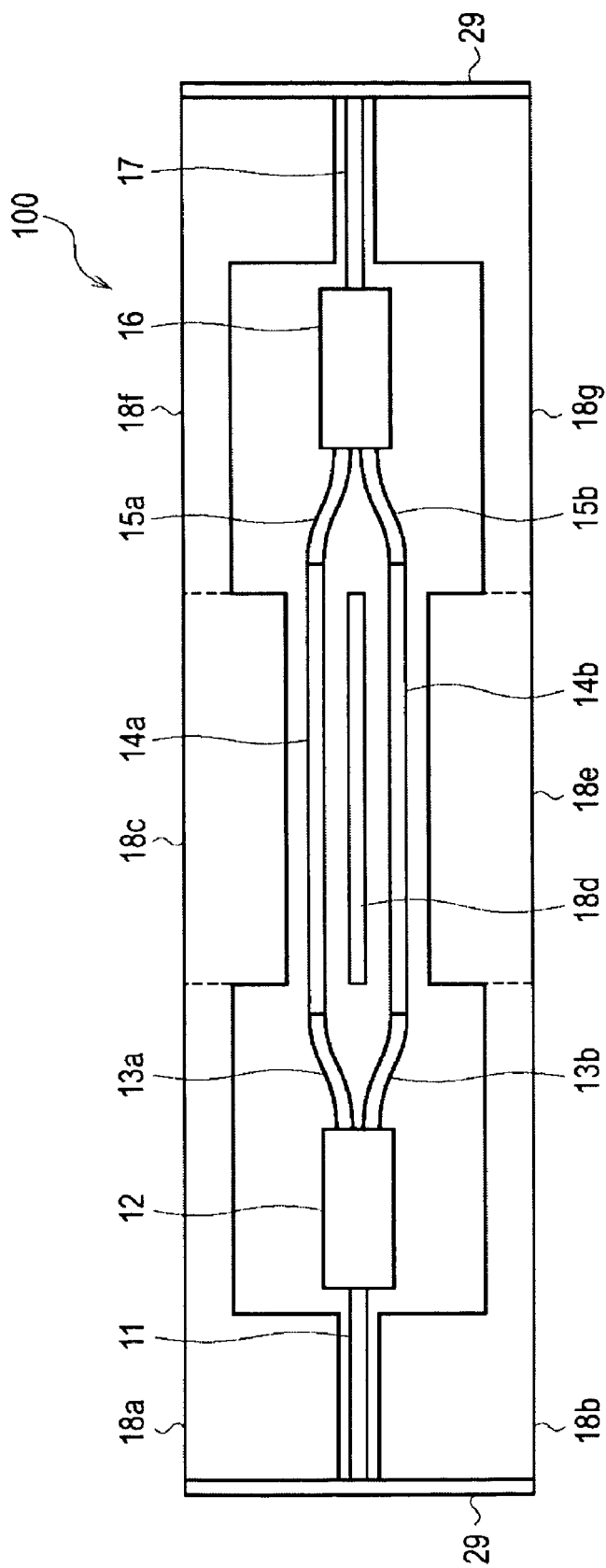
FIG. 2 is a plan view showing a semiconductor part of the optical switch shown in FIG. 1.

FIG. 1 is a plan view schematically showing an optical switch 100 according to the first embodiment of the present invention. FIG. 2 is a plan view showing a semiconductor part of the optical switch 100 shown in FIG. 1. As shown in FIG. 1 and FIG. 2, the optical switch 100 has deep ridge waveguides, i.e., an input waveguide 11, an input MMI coupler (multimode interference coupler) 12, input bending waveguides 13a, 13b, phase modulation waveguides 14a, 14b, output bending waveguides 15a, 15b, an output MMI coupler 16, and an output waveguide 17, which are connected in this order, support mesa part 18a-19g having a mesa structure, a pad electrode 27, and a low reflection coating film 29.

Both the input waveguide 11 and the output waveguide 17 are 200 μm in length. Further, all of the input bending waveguides 13a, 13b and the output bending waveguides 15a, 15b are S-shaped waveguides in which two circular arc waveguides of 250 μm of a radius of a curvature are connected. The width of the deep ridge waveguides is 2.0 μm except for the MMI couplers.

The optical switch 100 operates as follows. That is, the input MMI coupler 12 receives a light whose wavelength is within a 1.55 μm band from the input waveguide 11 and splits the light into two lights, which are then output to the modulation waveguides 14a, 14b through the input bending waveguides 13a, 13b. The phase modulation waveguides 14a, 14b give no or a predetermined amount of phase difference between the two lights according to an input voltage signal, and output the lights to the output MMI coupler 16 through the output bending waveguides 15a, 15b. The output MMI coupler 16 couples the light and outputs the coupled light from the output waveguide 17 when the phase difference between the two lights is zero, or does not output the light from the output waveguide 17 when the phase difference between the two lights is the predetermined value. In this way, the optical switch 100 switches on or off the output light according to the input voltage signal.

Figure 3:
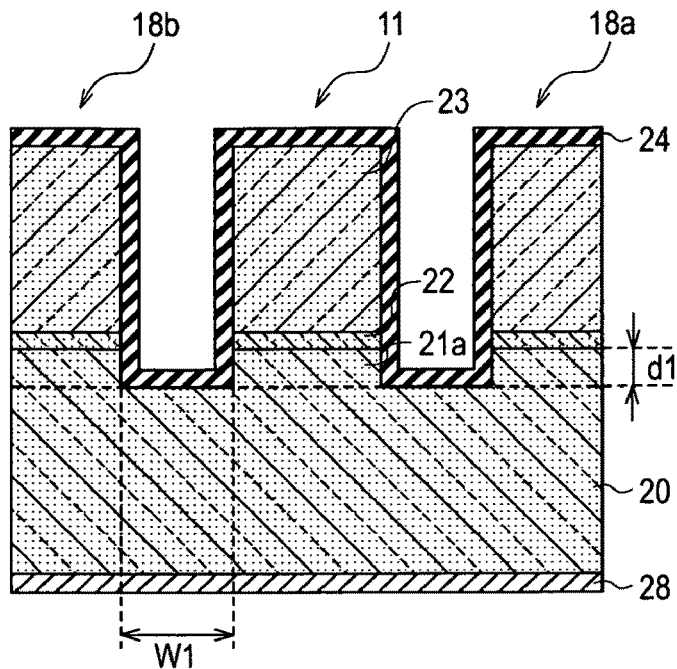
FIG. 3 is a schematic cross sectional view showing the optical switch taken along a line A-A in FIG. 1.

A cross sectional structure of each component will be described in detail below. FIG. 3 is a diagram schematically showing a cross section taken along A-A line in FIG. 1. As shown in FIG. 3, the input waveguide 11 is a deep ridge waveguide, in which a lower clad layer 21a formed as a portion of a substrate 20 projected from a surface of the substrate 20 by a projection height d1 and extended along the surface of the substrate 20, a core layer 22 having a GaInAsP multiple quantum well structure, and an upper clad layer 23 of p-InP are formed in this order on the substrate 20 made of n-InP. Further, on both lateral sides of the input waveguide 11, support mesa parts 18a, 18b, which have a similar lamination structure to the input waveguide 11, are formed with a separation W1 from the input waveguide 11. The support mesa parts 18a, 18b prevent the deep ridge waveguide, which is a fine projection from the substrate 20, from being broken by a physical contact with other objects during a manufacturing process or so. Further, as shown in FIG. 3, a passivation film 24 of $SiN_x$ is formed to cover surfaces of the input waveguide 11 and the support mesa parts 18a, 18b. An n-side electrode 28 of AuGeNi/Au is formed on a back surface of the substrate 20. The output waveguide 17 has a similar structure to the input waveguide 11. Further, support mesa parts 18f, 18g has a similar structure to the support mesa parts 18a, 18b.

Figure 4:
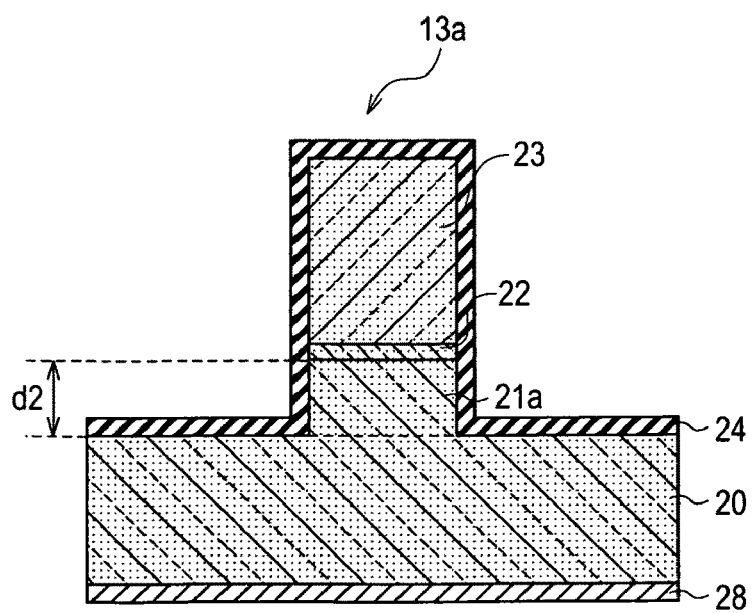
FIG. 4 is a schematic cross sectional view showing the optical switch taken along a line B-B in FIG. 1.

FIG. 4 is a diagram schematically showing a cross section taken along B-B line in FIG. 1. As shown in FIG. 4, similar to the input waveguide 11, the input bending waveguide 13a is a deep ridge waveguide in which a lower clad layer 21b formed as a portion of a substrate 20 projected from the surface of the substrate 20 by a projection height d2 and extended along the surface of the substrate 20, a core layer 22, and an upper clad layer 23 are formed in this order on the substrate 20. The input bending waveguide 13a is curved with a radius of curvature of 250 μm in a plane parallel to the surface of the substrate 20. Further, a passivation film 24 is formed to cover a surface of the input bending waveguide 13a. An n-side electrode 28 is formed on a back surface of the substrate 20. The input bending waveguide 13b and the output bending waveguides 15a, 15b have a similar structure to the input bending waveguides 13a.

Figure 5:
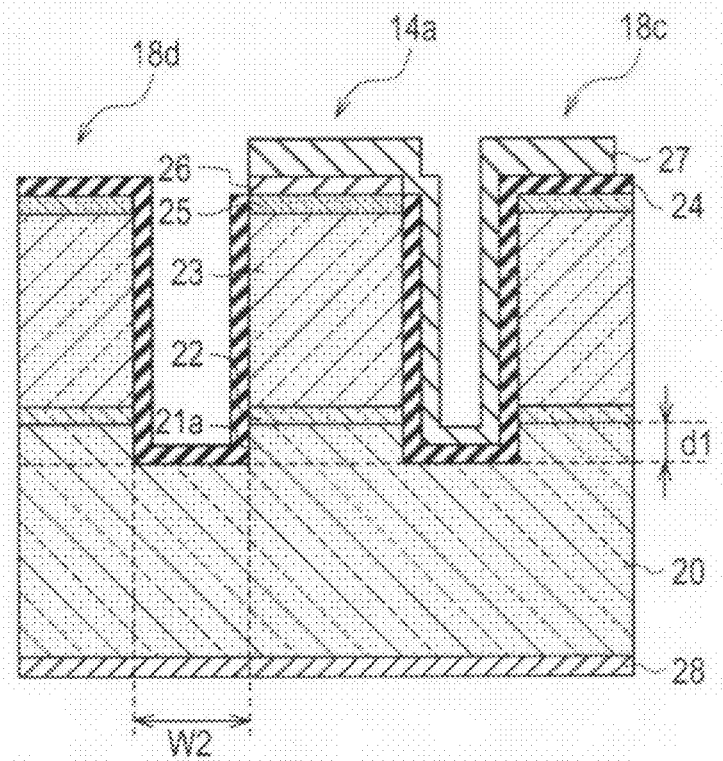
FIG. 5 is a schematic cross sectional view showing the optical switch taken along a line C-C in FIG. 1.

FIG. 5 is a diagram schematically showing a cross section taken along C-C line in FIG. 1. As shown in FIG. 5, similar to the input waveguide 11, the phase modulation waveguide 14a is a deep ridge waveguide in which a lower clad layer 21a formed as a portion of a substrate 20 projected from the surface of the substrate 20 by a projection height d1 and extended along the surface of the substrate 20, a core layer 22, and an upper clad layer 23 are formed in this order on the substrate 20. A contact layer of GaInAsP and a p-side electrode 26 of Au/AuZn are formed in this order on the upper clad layer 23. Further, on both lateral sides of the phase modulation waveguides 14a, support mesa parts 18c, 18d, which have a similar lamination structure to the support mesa parts 18a, 18b except for further having a contact layer 25 on the upper clad layer 23, are formed with a separation W2 from the phase modulation waveguide 14a. A passivation film 24 is formed to cover a surface of the support mesa parts 18c, 18d and a surface of the phase modulation waveguide 14a except for a portion of the p-side electrode 26. Further, a pad electrode 27 of Ti/Pt/Au is formed to cover a part of a surface of the support mesa part 18c and a surface of the p-side electrode 26 on the phase modulation waveguide 14a. An n-side electrode 28 is formed on the back surface of the substrate 20. The phase modulation waveguide 14b has a similar structure to the phase modulation waveguide 14a. Further, a support mesa part 18e has a similar structure to the support mesa part 18c.

A wavelength corresponding to a band gap energy of the core layer 22 is 1.45 μm, so the core layer 22 is transparent to a light having a wavelength of 1.55 μm. An average refractive index of the core layer 22 along a thickness direction is 3.31, and a refractive index of the substrate 20, the lower clad layer 21a, 21b, and the upper clad layer 23 is 3.17. In the phase modulation waveguides 14a, 14b, a refractive index of the core layer 22 can be changed by supplying an electric current between the p-side electrode 26 and the n-side electrode 28 through the pad electrode 27, whereby the phase of the light propagating in the phase modulation waveguides 14a, 14b can be changed. A thickness of the upper clad layer 23 is 2.50 μm, and a total thickness of the core layer 22 is 0.30 μm. Further, a thickness of the contact layer 25 is 0.30 μm.

A projection height of the lower clad layers 21a, 21b will be explained below. The projection height d1 of the lower clad layer 21a in the straight waveguide, i.e., the input waveguide 11 etc., is 0.50 μm. With this projection height, a light of higher order modes attenuates sufficiently along the waveguide, whereby light propagation in higher order modes is restrained.

On the other hand, the projection height d2 of the lower ad layer 21b in the input bending waveguides 13a, 13b and the output bending waveguides 15a, 15b is 1.00 μm, which is greater than the projection height d1 of the lower clad layer 21a in the straight waveguide. With this projection height, the bending propagation loss of the light propagating in fundamental mode is sufficiently restrained.

An explanation will be given in detail below. In general, the bending propagation loss of a waveguide depends on a difference between a refractive index of an external medium and a mode refractive index of the waveguide. The greater the difference becomes, the smaller the bending propagation loss becomes. In the deep ridge waveguide, on both sides of the core layer is present air which has a small refractive index, and therefore a difference of refractive index in the lateral direction is extremely large. For this reason, the deep ridge waveguide has been considered to be advantageous in terms of reducing bending propagation loss and have a reduced propagation loss even with a small radius of curvature.

However, in the deep ridge waveguide designed such that the higher order mode light is attenuated by being adequately radiated, a bending propagation loss of fundamental mode in a bending waveguide is large, and it is not practically negligible. The inventors have considered that it is because of the presence of a substrate under the lower clad layer.

Figure 6:
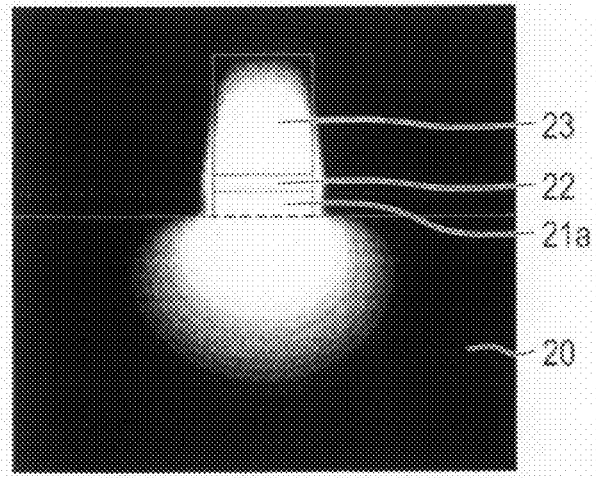
FIG. 6 is a view showing an electromagnetic field distribution calculated by a numerical simulation.

FIG. 6 is a view showing an electromagnetic field distribution calculated by numerical simulation for the input waveguide 11. As shown in FIG. 6, the electromagnetic field of fundamental mode light is distributed not only in the core layer 22 but also in the upper clad layer 23, the lower clad layer 21a, and further in the substrate 20, i.e., an evanescent component of the fundamental mode light spreads over these surrounding regions. Accordingly, it is necessary to take into account a possible contribution of the evanescent component in the substrate 20 to the bending propagation loss. When taking the evanescent component into account, a refractive index of the 'external medium' means a refractive index of the substrate 20. Accordingly, it is the difference between a mode refractive index of the input waveguide 11 and a refractive index of the substrate 20 that determines the bending propagation loss. Since the substrate 20 is made of a semiconductor, the refractive index thereof is extremely greater than that of air, and it is close to the mode refractive index of the input waveguide 11. That is, for the evanescent component of light, the difference of refractive index that determines the bending propagation loss is not large.

However, the evanescent component of the electromagnetic field is attenuated to some extent from the core layer 22 of the input waveguide 22 to the substrate 20. That is, a part of the evanescent component that contributes to an increase in the bending propagation loss based on the small difference in the refractive index is small. As a result, in the deep ridge waveguide, the bending propagation loss is reduced as compared with a simple waveguide with a small difference of refractive index. Accordingly, the bending propagation loss can be further reduced when the attenuation of the evanescent component to the substrate 20 is made large.

Figure 7:
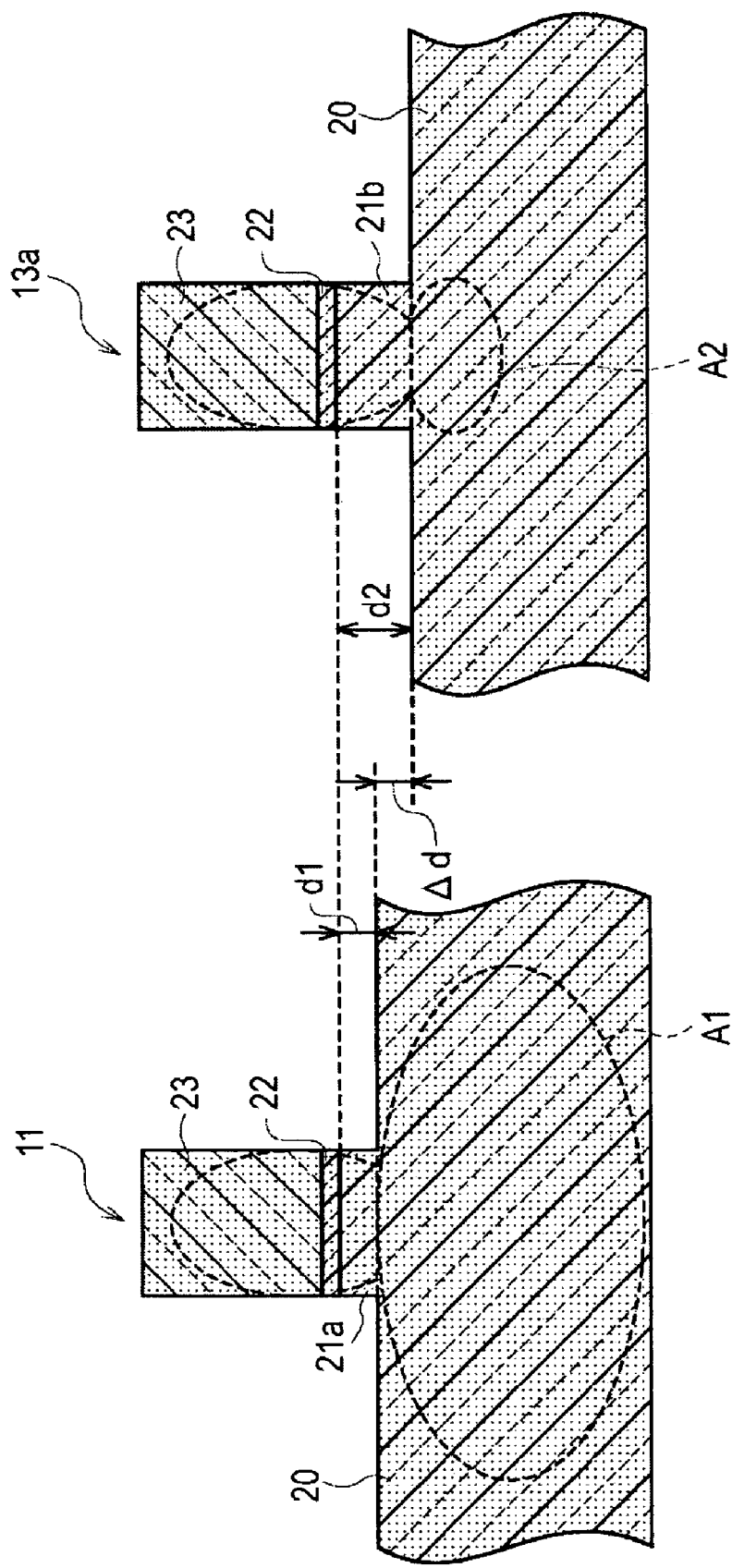
FIG. 7 is a schematic view showing a spread of an evanescent component of the electromagnetic field in an input waveguide and in an input bending waveguide.

FIG. 7 is a view schematically showing a spread of an evanescent component of the electromagnetic field in the input waveguide 11 and in the input bending waveguide 13a. In FIG. 7, the region A1, A2 schematically depicts the spread of the evanescent component. As shown in FIG. 7, in the input waveguide 11, the projection height d1 of the lower clad layer 21a is relatively small, so an area of the region A1 inside the substrate 20 is large. On the other hand, in the input bending waveguide 13a, the projection height d2 of the lower clad layer 21b is greater than the projection height d1 by a difference Δd, so the attenuation of the evanescent component to the substrate 20 is greater and an area of the region A2 inside the substrate 20 is smaller than in the input waveguide 11.

Accordingly, in the optical switch 100 according to the first embodiment, the projection height d1 of the lower clad layer 21a in the straight waveguide, i.e., the input waveguide 11 etc., is set to 0.50 μm and the projection height d2 of the input bending waveguides 13a, 13b and the output bending waveguides 15a, 15b is set to 1.00 μm, which is greater than the projection height d1. Thereby, light propagation in higher order modes is restrained and the bending propagation loss of the fundamental mode light is sufficiently restrained.

Figure 8:
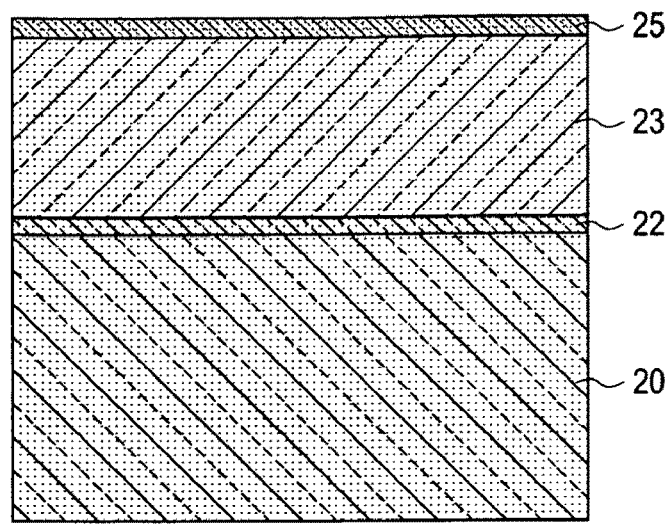
FIG. 8 is a schematic sectional view No. 1 showing a method of manufacturing the optical switch shown in FIG. 1.
Figure 9:
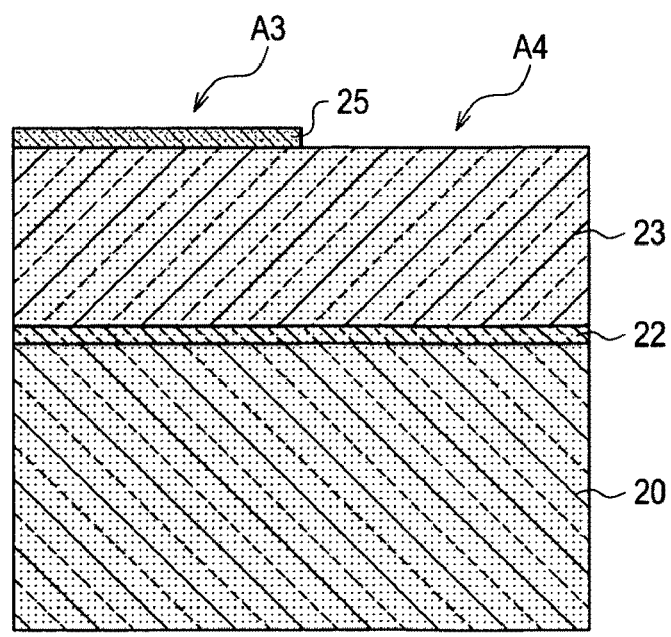
FIG. 9 is a schematic sectional view No. 2 showing the method of manufacturing the optical switch shown in FIG. 1.

An example of manufacturing method of the optical switch 100 will be explained below with reference to FIGS. 8 to 15. FIG. 8 and FIG. 9 show schematic cross sectional views taken along D-D line in FIG. 1. As shown in FIG. 8, a core layer 22 having a GaInAsP multiple quantum well structure, a p-InP upper clad layer 23, and a GaInAsP contact layer 25 are sequentially grown on an n-InP substrate 20 to form a lamination structure, using a crystal growth apparatus such as MOCVD apparatus. A total thickness of the core layer 22 and the upper clad layer 23 is 2.80 μm, and a thickness of the contact layer 25 is 0.30 μm. Then, a part of the contact layer is removed by etching, leaving the contact layer 25 on the region in which phase modulation waveguides 14a, 14b and support mesa parts 18c to 18e are to be formed. In FIG. 9, the region A3 designates the region in which the phase modulation waveguide 14a is to be formed, and the region A4 designates the region in which an output bending waveguide 15a is to be formed.

Then, a mask pattern of $SiN_x$ film is formed on the entire top surface. The mask pattern includes a waveguide mask pattern and a support mesa mask pattern. The waveguide mask pattern has the same shape as the input waveguide 11, the input MMI coupler 12, the input bending waveguides 13a, 13b, the phase modulation waveguides 14a, 14b, the output bending waveguides 15a, 15b, the output MMI coupler 16, and the output waveguide 17, which are to be formed as shown in FIG. 2. The waveguide mask pattern has a straight part in a portion corresponding to the straight waveguide and a bending part in a portion corresponding to the bending waveguide. The support mesa mask pattern is formed in a region apart from the waveguide mask pattern on both lateral sides thereof, and has the same shape as the support mesa parts 18a to 18g to be formed.

Thereafter, using the mask pattern, the lamination structure is dry-etched to remove the contact layer 25, the upper clad layer 23, and the core layer 22 over to the substrate 20, by RIE (reactive ion etching) using chlorine gas. The mesa structure is formed thereby.

Figure 10:
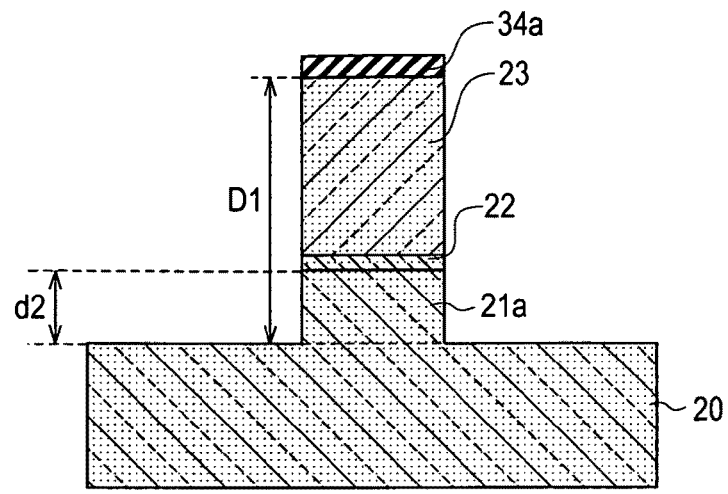
FIG. 10 is a schematic sectional view No. 3 showing the method of manufacturing the optical switch shown in FIG. 1.

FIG. 10 shows a schematic cross section taken along B-B line after dry-etching. As shown in FIG. 10, a mesa structure, which is to be an input bending waveguide 13a having a lower ad layer 21b, a core layer 22, and an upper clad layer 23, is formed beneath the waveguide mask pattern 34a by the dry-etching. The lower clad layer 21b is formed as a projected portion of the substrate 20 with a projection height d2 of 1.00 μm. In the region where the bending waveguide is to be formed, an etching depth D1 from an undersurface of the waveguide mask pattern 34a is 3.80 μm, and a separation between the waveguide mask pattern 34a and the support mesa mask pattern is not less than 20 μm.

Figure 11:
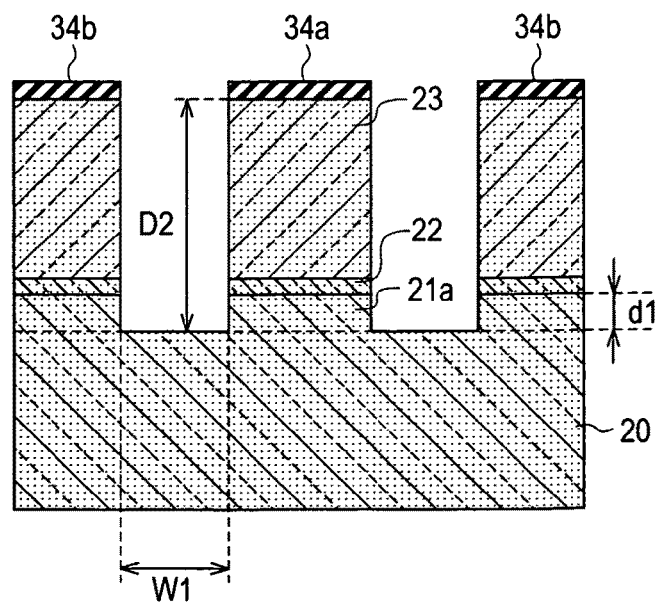
FIG. 11 is a schematic sectional view No. 4 showing the method of manufacturing the optical switch shown in FIG. 1.

FIG. 11 shows a schematic cross section taken along A-A line after dry-etching. As shown in FIG. 11, a mesa structure, which is to be an input waveguide 11 having a lower clad layer 21a, a core layer 22, and an upper clad layer 23, is formed beneath the waveguide mask pattern 34a by the dry-etching. The lower clad layer 21a is formed as a projected portion of the substrate 20 with a projection height d1 of 0.50 μm. Further, mesa structures which are to be support mesa parts 18a, 18b are formed beneath the support mesa pattern 34b. In the region where the input waveguide 11 and the output waveguide 17 are to be formed, an etching depth D2 from an undersurface of the waveguide mask pattern 34a is 3.30 μm, and a separation W1 between the waveguide mask pattern 34a and the support mesa mask pattern 34b is 1.7 μm.

Figure 12:
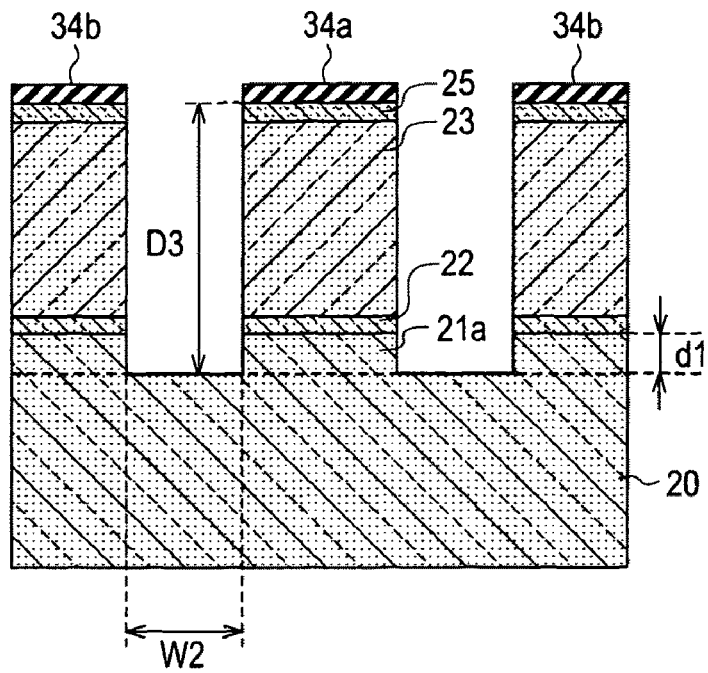
FIG. 12 is a schematic sectional view No. 5 showing the method of manufacturing the optical switch shown in FIG. 1.

FIG. 12 shows a schematic cross section taken along C-C line after dry-etching. As shown in FIG. 12, a mesa structure, which is to be a phase modulation waveguide 14a having a lower ad layer 21a, a core layer 22, an upper clad layer 23, and a contact layer 25, is formed beneath the waveguide mask pattern 34a by the dry-etching. The lower clad layer 21a is formed as a projected portion of the substrate 20 with a projection height d1 of 0.50 μm. Further, mesa structures which are to be support mesa parts 18c, 18d are formed beneath the support mesa pattern 34b. In the region where the phase modulation waveguides 14a, 14b are to be formed, an etching depth D3 from an undersurface of the waveguide mask pattern 34a is 3.60 μm, and a separation W2 between the waveguide mask pattern 34a and the support mesa mask pattern 34b is 4.0 μm.

In the above mentioned dry-etching, micro-loading effect is used to etch plural regions by different depths D1-D3 in a single etching process. Specifically, the separation between the waveguide mask pattern 34a and the support mesa mask pattern 34b, or the etching width, is changed by a region to make the etching depths D1-D3 different by a region. Here, the micro-loading effect refers to a phenomenon in which the etching rate differs according to the etching width between mask patterns.

Figure 13:
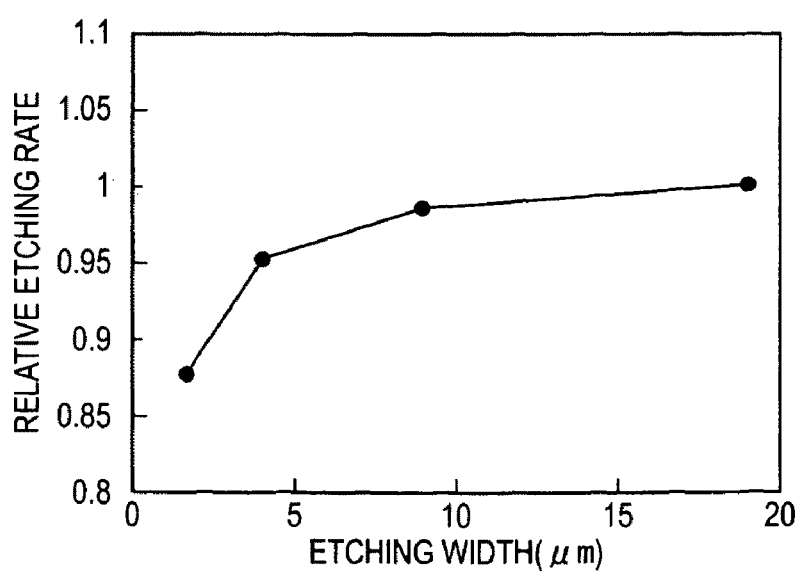
FIG. 13 is a graph showing a relationship between an etching width and a relative etching rate when RIE (Reactive Ion Etching) is performed on an InP-based semiconductor material using chlorine gas.

FIG. 13 is a graph showing a relationship between the etching width and the relative etching rate when performing RIE using chlorine gas for InP-based semiconductor material. The relative etching rate is expressed by a ratio of an etching rate to the etching rate when the etching width is large enough for the micro-loading effect to be negligible. As shown in FIG. 13, the smaller the etching width becomes, the smaller the etching rate becomes. The micro-loading effect is conspicuous in the case of etching width being smaller than 4 μm, where a decrease in the etching rate is clearly seen. On the other hand, in the case of etching width being 20 μm, the micro-loading effect scarcely occurs. Therefore, in order to actively use the difference of etching rate due to the micro-loading effect, the etching width at a shallowly etched region is preferably set to not greater than 4 μm.

The separation between the waveguide mask pattern and the support mesa mask pattern is set such that a lower clad layer of desired projection height can be formed in each region in the above mentioned dry-etching process, using the difference of etching rate shown in FIG. 13. Note that the projection height d1 of the lower clad layer 21a is set to 0.50 μm in both the regions where the phase modulation waveguides 14a, 14b are to be formed and the regions where the input waveguide 11 or the output waveguide 17 is to be formed. However, in the region where the phase modulation waveguides 14a, 14b are to be formed, the contact layer 25 of 0.30 μm in thickness is present. Therefore, the etching depths D2, D3 are made different from each other by setting the separation widths W1, W2 in the respective regions different from each other.

In the regions where the input MMI coupler 12 and the output MMI coupler 16 are to be formed, the separation between the waveguide mask pattern and the support mesa mask pattern is set to not less than 20 μm, like in the region where the bending waveguide is to be formed. However, the projection height of the lower clad layer does not affect very much to the characteristics of the input MMI coupler 12 and the output MMI coupler 16. Therefore, the separation is not limited to some specific value. Further, even in the region where the straight waveguide is to be formed, the separation is preferably set large in the vicinity of connection portion of the bending waveguide and the straight waveguide.

In the above process, the etching is performed only one time. Accordingly, it is possible to manufacture a device at low cost. Further, it is not necessary to perform plural times of lithography to form mask. Therefore, there arises no problem of pattern shift etc. The above etching process is only one example, and the etching process is not limited thereto. Another example may include performing plural times of etching according to different required etching depths among the regions.

Figure 14:
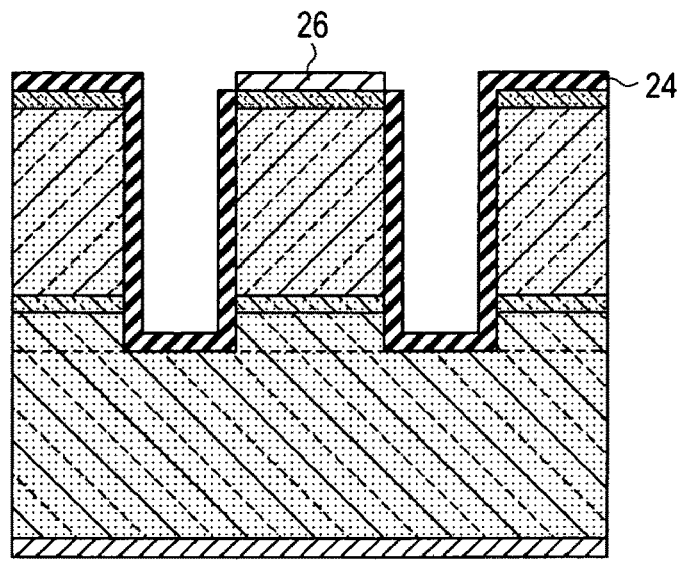
FIG. 14 is a schematic sectional view No. 6 showing the method of manufacturing the optical switch shown in FIG. 1.
Figure 15:
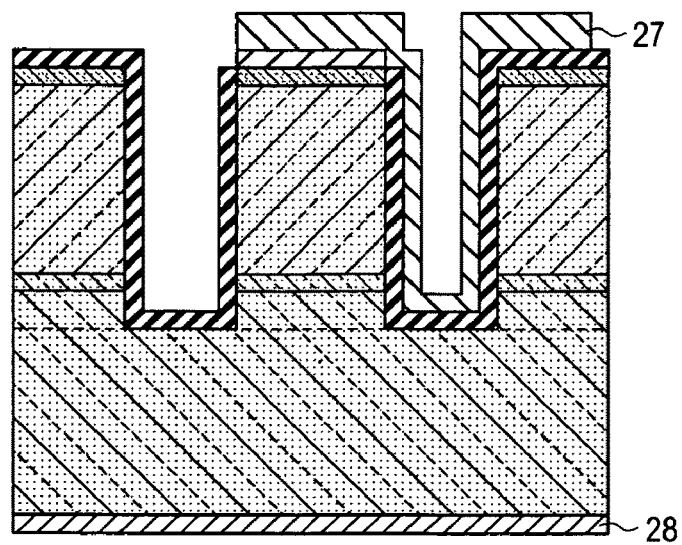
FIG. 15 is a schematic sectional view No. 7 showing the method of manufacturing the optical switch shown in FIG. 1.

FIG. 14 and FIG. 15 show schematic cross sections taken along C-C line. As shown in FIG. 14, a passivation film 24 of $SiN_x$ is formed on the entire surface, and then, a part of the passivation film 24 in the region to be the phase modulation waveguides 14a, 14b is removed. Thereafter, a p-side electrode 26 of Au/AuZn is formed by evaporation. Then, as shown in FIG. 15, a pad electrode 27 of Ti/Pt/Au is formed in a predetermined region. The back surface of the substrate 20 is polished, and an n-side electrode 28 of AuGeNi/Au is formed on the polished back surface. Thereafter, edge surfaces of the input waveguide 11 and the output waveguide 17 are formed by cleavage, and a low reflection coating film 29 is formed on the edge surfaces. In this way, an optical switch 100 is completed.

As explained above, in the optical switch 100 according to the first embodiment, light propagation in higher order modes is restrained and the bending propagation loss of the light propagating in fundamental mode is sufficiently restrained.

In the first embodiment, the projection height d1 of the lower clad layer 21a in the straight waveguide is set to 0.50 μm, the projection height d2 of the lower clad layer 21b in the bending waveguide is set to 1.00 μm, and the radius of curvature of the bending waveguide is set to 250 μm. However, the design parameters are not limited to these values.

Figure 16:
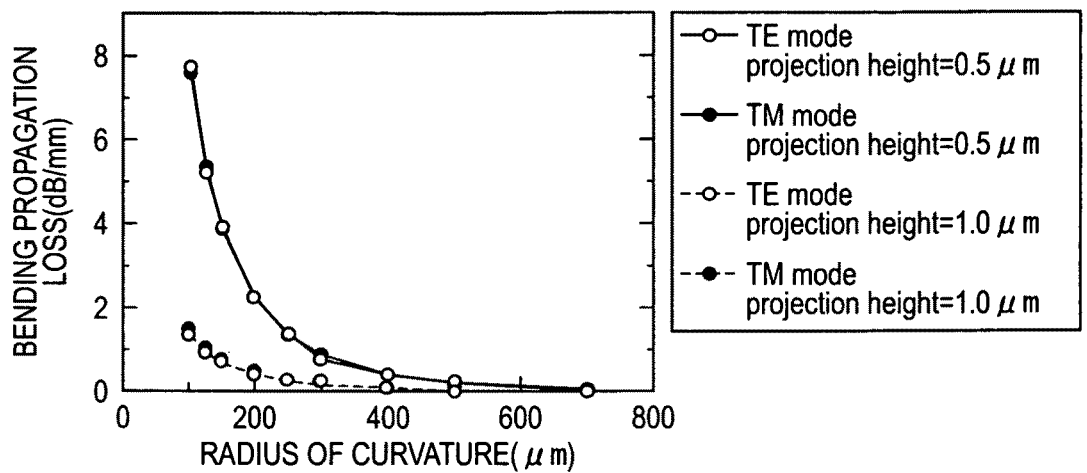
FIG. 16 is a graph plotting calculated values of a bending propagation loss of a fundamental mode as a function of a radius of a curvature of a bending waveguide.

FIG. 16 is a graph plotting calculated values of the bending propagation loss of fundamental mode as a function of radius of curvature for the bending waveguide having a similar waveguide structure to the input bending waveguide 13a according to the first embodiment. FIG. 16 plots the data for the case of projection height of the lower clad layer being 1.00 μm, which is the case of the first embodiment, and for the case of projection height being 0.50 μm, which is the same value as the projection height of the lower clad layer in the straight waveguide. As shown in FIG. 16, the bending propagation loss increases exponentially with a decrease in radius of curvature for both TE mode and TM mode. In the case of projection height being 1.00 μm as in the first embodiment, the increase of bending propagation loss is restrained for every value of radius of curvature, and the difference from the case of projection height being 0.50 μm becomes conspicuous as the radius of curvature decreases to not greater than about 250 μm. Although there is not specifically a lower limit of the radius of curvature in terms of the decreasing effect of the bending propagation loss, the mode conversion loss at the connection portion of the straight waveguide and the bending waveguide becomes large when the radius of curvature is less than 20 μm. For this reason, the radius of curvature is preferably set to not less than 20 μm.

Figure 17:
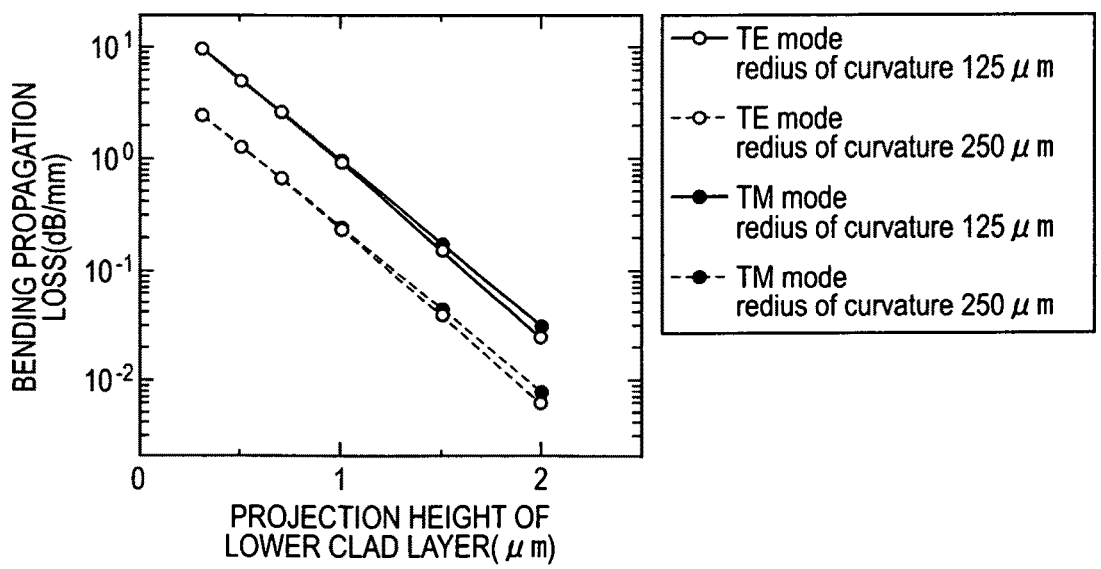
FIG. 17 is a graph plotting calculated values of the bending propagation loss of the fundamental mode as a function of a projection height of a lower clad layer of the bending waveguide.

FIG. 17 is a graph plotting calculated values of the bending propagation loss as a function of projection height of lower clad layer for the bending waveguide having a similar waveguide structure to the input bending waveguide 13a according to the first embodiment. FIG. 17 plots the data for the cases of radius of curvature of 125 μm and 250 μm. Note that the vertical axis in FIG. 17 is log-scaled. As shown in FIG. 17, the bending propagation loss (in dB/mm) decreases exponentially with an increase in the projection height for both the TE mode and TM mode. In FIG. 17, the trend is linear. As understood from the slope of the straight lines in FIG. 17, the difference of the projection height of not less than 0.50 μm causes the ratio of the bending propagation loss (in dB/mm) of not less than 5, which is a clear difference in the bending propagation loss.

That is, when setting the projection height d1 of the lower ad layer 21a in the straight waveguide to 0.50 μm and the projection height d2 of the lower clad layer 21b in the bending waveguide to 1.00 μm, an apparent decreasing effect of bending propagation loss is obtained as compared with the case where the projection height of the lower clad layer in all the waveguide is set to 0.50 μm, which is the designed value of the straight waveguide.

Further, although the bending propagation loss becomes smaller with an increase in the projection height of the lower ad layer, as shown in FIG. 17, it is not actually possible to make a lower clad layer with an infinitely large projection height. Therefore, the projection height of the lower clad layer is preferably determined such that the bending propagation loss is practically small enough for a desired radius of curvature. Under a current manufacturing technology of the deep ridge waveguide, a scattering loss of about 0.5 dB/mm occurs due to manufacturing variation. Therefore, the bending propagation loss of not greater than about 0.5 dB/mm would be allowed. According to FIG. 7, in order to restrain the bending propagation loss to not greater than 0.5 dB/mm, the projection height should be not less than 0.90 μm for the case of radius of curvature of not greater than 250 μm. The projection height should be not less than 1.20 μm for the case of radius of curvature of not greater than 125 μm in order to restrain the bending propagation loss to not greater than 0.5 dB/mm.

As a first example of the present invention, an optical switch having a similar structure to the optical switch 100 according to the first embodiment was fabricated. Further, as comparative examples, an optical switch having a similar structure to the optical switch 100 except for the projection height of the lower clad layer in all waveguides being set at 0.50 μm (a first comparative example), and one except for the projection height of the lower clad layer in all waveguides being set at 1.00 μm (a second comparative example) were fabricated. The characteristics of these optical switches were tested by making a light of 1.55 μm wavelength incident thereon.

The result was that the extinction ratio of the optical switches of the first example and the first comparative example was good value of 30 dB, while that for the second comparative example was a low value of 15 dB. This is considered to be because the optical switch of the second comparative example does not have good single mode characteristics, i.e., some part of the light propagates in higher order modes and is not sufficiently extinct based on the difference of extinction characteristics between fundamental mode and higher order modes.

As for the insertion loss, the optical switches of the first example and the second comparative example showed a low value of 1.5 dB with a coupling loss exuded, while the first comparative example showed a high value of 2.5 dB. This is considered to be because the optical switch of the first comparative example is subject to a large bending propagation loss in the bending waveguide.

As described above, it was confirmed that in the optical switch of the first example, a light propagation in higher order modes is restrained. Accordingly, the extinction ratio is good. Further, the bending propagation loss is small. Accordingly, the insertion loss is small.

According to FIG. 17, a difference of the projection height of the lower clad layer of not less than 0.5 μm gives a ratio of the bending propagation loss (dB/mm) (hereinafter referred to as reduction ratio of bending propagation loss) of not less than five. However, strictly considering, the difference of the projection height of the lower clad layer that gives a reduction ratio of the bending propagation loss of not less than five depends on the thickness and the refractive index of the core layer. Therefore, when altering a structural design in the thickness direction, a difference of the projection height of the lower clad layer between in the straight waveguide and in the bending waveguide has to be changed accordingly.

An explanation will be given in detail below. As described above, it is because an evanescent component of the electromagnetic field in the lower clad layer attenuates that the bending propagation loss is reduced by increasing the projection height of the lower clad layer. Accordingly, the dependence of the bending propagation loss on the projection height of the lower clad layer changes with the steepness of the evanescent component attenuation.

For a channel waveguide in which light is strongly confined in the core layer, it is possible to separately calculate a light confinement in a thickness direction and a lateral direction by using an effective index method. Suppose that $n_{eff}$ is an effective refractive index of a slab waveguide having a similar lamination structure to a deep ridge waveguide and with sufficiently large width in lateral direction. Then, a electric field distribution E of the evanescent component in the clad layer is expressed by the following formula (2):

$$E = E_0 \exp[-k_0(n_{eff}^2 - n_{clad}^2)^{1/2} y] \qquad (2)$$

where $E_0$ represents a constant in a dimension of electric field, $k_0$ represents a wave number in a free space, and $n_{clad}$ represents a refractive index of the clad layer. A variable y represents a location in a thickness direction, with an interface between the core layer and the clad layer being positioned at zero, and takes positive value when going away from the waveguide. The effective refractive index $n_{eff}$ can be calculated by transfer matrix method, etc.

The electric field distribution being expresses by the formula (2), the optical power distribution can be expressed by the square of the electric field distribution. Since the bending propagation loss is affected by a degree of attenuation of the optical power distribution in the lower clad layer, the bending propagation loss (L) is considered to depend on the projection height of the lower clad layer ($d_{lower}$) in a manner expressed in the following equation (3):

$$L = L_0 \exp\left[-2k_0(n_{eff}^2 - n_{clad}^2)^{1/2} d_{lower}\right] \qquad (3)$$
$$= L_0 \exp(-\alpha d_{lower})$$

$$\text{where } \alpha = 2k_0(n_{eff}^2 - n_{clad}^2)^{1/2} \qquad (4)$$

In the above equation, $L_0$ represents a constant of the bending propagation loss. A symbol α represents a decreasing effect of the bending propagation loss due to an increase in the projection height of the lower clad layer. When conducting a numerical simulation, the decreasing effect α can be found by fitting the dependence of the bending propagation loss on the projection height of the lower clad layer, as shown in FIG. 17.

Figure 18:
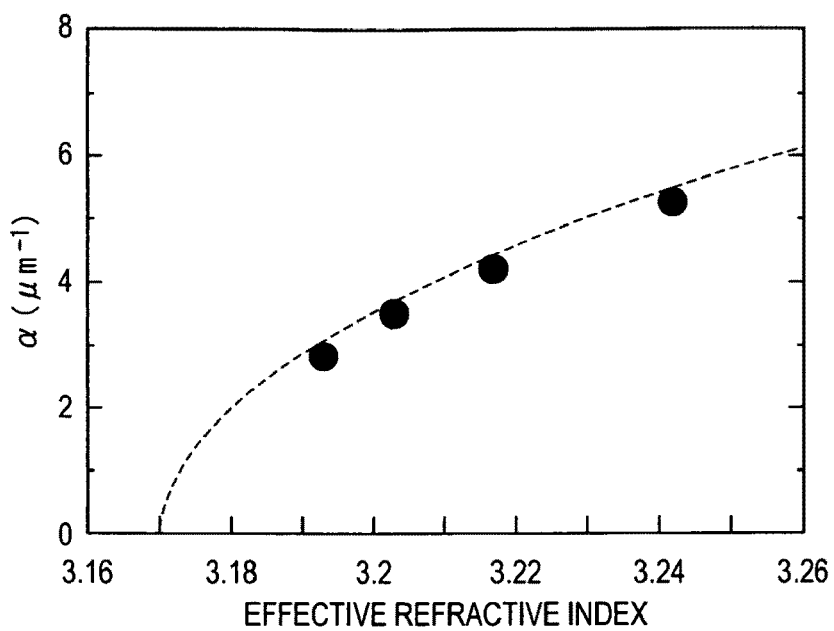
FIG. 18 is a graph showing a relationship between an effective refractive index $n_{eff}$ and a decreasing effect $\alpha$ of a slab waveguide.

FIG. 18 is a graph showing a relationship between an effective refractive index $n_{eff}$ and the decreasing effect α for a slab waveguide. In FIG. 18, filled circles represent values of the decreasing effect α obtained by numerical simulation versus the effective refractive index of a slab waveguide. The effective refractive index is changed by changing a refractive index of the core layer, with the wavelength being set at 1.55 µm, the refractive index of the clad layer being set at 3.17, and a thickness of the core layer being set at 0.30 µm. The filled circles represent the cases of the refractive index of the core layer of 3.28, 3.31, 3.34, 3.39, when the refractive indexes of the slab waveguide are 3.193, 3.203, 3.217, 3.242, respectively. On the other hand, in FIG. 18, the dashed line represents the theoretical formula of the equation (4). As understood from FIG. 18, the filled circles and the dashed line are well in agreement, which shows that the equation (4) is correct. Note that the equation (4) holds when values of the refractive indexes of the core layer and the clad layer and the wavelength of the light are determined, irrespective of the material of the core layer and the clad layer.

Here, suppose that the projection height of the lower clad layer in the straight waveguide is $d_1$ and that the projection height of the lower clad layer in the bending waveguide is $d_2$, then the difference $\Delta d$ ($=d_2-d_1$) of the projection heights of the lower clad layers between in the straight waveguide and in the bending waveguide can be found as follows, using the equation (3):

$$5 \leq L_0\exp(-\alpha d_2)/L_0\exp(-\alpha d_1) \quad (1)$$
$$= \exp(-\alpha\Delta d)$$

Therefore, $$\Delta d \geq \ln5/\alpha$$
$$= \ln5/\left[2k_0(n_{\it eff}^2 - n_{\it clad}^2)^{1/2}\right]$$
$$= 0.81/\left[k_0(n_{\it eff}^2 - n_{\it clad}^2)^{1/2}\right]$$
$$= 0.13\lambda/(n_{\it eff}^2 - n_{\it clad}^2)^{1/2}$$

That is, $$\Delta d \geq 0.13\lambda/(n_{\it eff}^2 - n_{\it clad}^2)^{1/2}$$

where $\lambda$ is a vacuum wavelength.

Accordingly, when the difference of the projection height $\Delta d$ satisfies the equation (1), the decreasing effect of the bending propagation loss due to increasing the projection height of the lower clad layer in the bending waveguide is apparent as compared with the case where the projection height of the lower clad layer is constant at the value of the projection height in the straight waveguide over all the waveguides. That is, although the waveguides are formed of InP-based materials in the above first embodiment, the waveguides may be formed of other semiconductor materials or optical material such as glass etc., so as to satisfy the equation (1).

Second Embodiment

A second embodiment of the present invention will be explained below. The optical integrated device according to the second embodiment is a bending waveguide integrated laser having an operation wavelength, or an oscillation wavelength, within 1.55 µm band.

Figure 19:
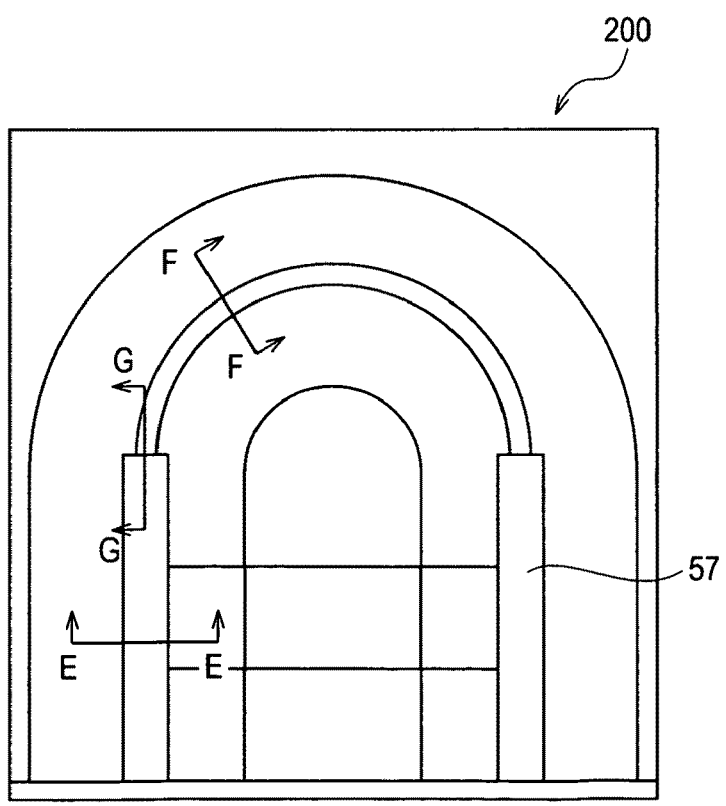
FIG. 19 is a schematic plan view showing a bending waveguide integrated laser according to a second embodiment of the present invention.
Figure 20:
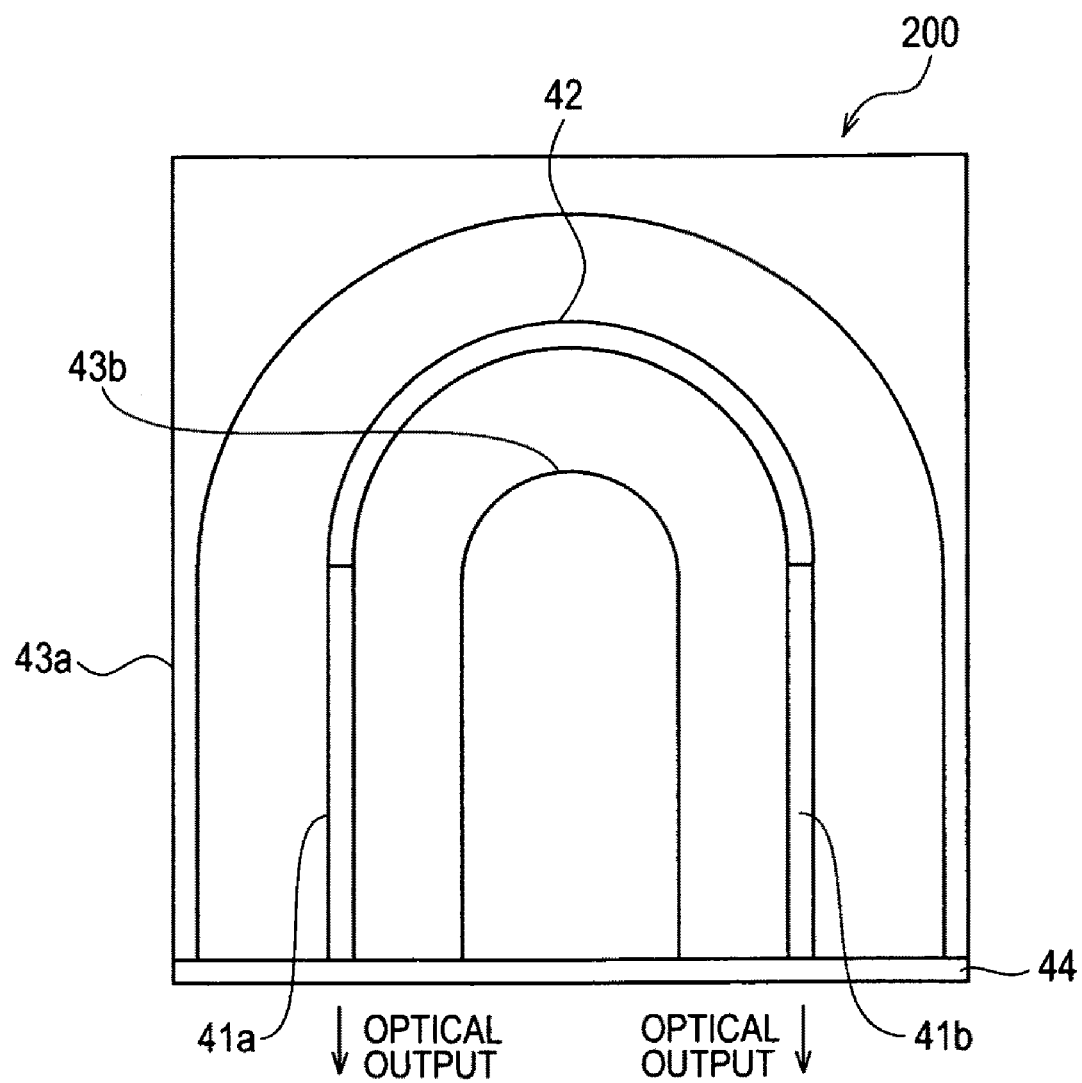
FIG. 20 is a schematic plan view showing a semiconductor part of the bending waveguide integrated laser shown in FIG. 19.

FIG. 19 is a plan view schematically showing the bending waveguide integrated laser 200 according to the second embodiment. FIG. 20 is a plan view showing a semiconductor part of the bending waveguide integrated laser 200 shown in FIG. 19. As shown in FIG. 19 and FIG. 20, the bending waveguide integrated laser 200 has a laser part waveguide 41a, a bending waveguide 42, a laser part waveguide 41b, which are serially connected in this order, support mesa parts 43a, 43b, a coating film 44, and a pad electrode 57.

A length of both of the laser part waveguides 41a and 41b is 200 µm. The bending waveguide 42 is a circular arc waveguide having a radius of curvature of 125 µm. A width of each of the deep ridge waveguides is 2.0 µm. The coating film 44 is formed of a dielectric, and has a reflectivity of about 99% in a wavelength band of 1.55 µm.

The bending waveguide integrated laser 200 operates as follows. That is, when a drive current is injected into the laser part waveguides 41a, 41b, a luminescence in a 1.55 µm band occurs in the laser part waveguides 41a, 41b. The luminescent light becomes a cause of a laser oscillation in an optical cavity formed by the laser part waveguide 41a, the bending waveguide 42 and the laser part waveguide 41b as a waveguide and the coating film 44 as a reflecting mirror. A laser light is emitted from the coating film 44.

Figure 21:
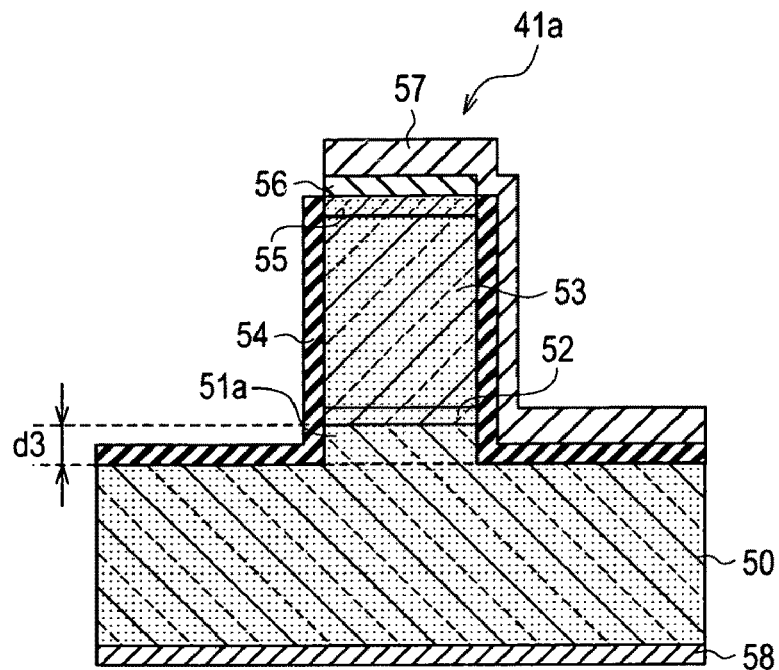
FIG. 21 is a schematic cross sectional view showing the bending waveguide integrated laser taken along E-E line in FIG. 19.

A structural detail of each component will be explained below. FIG. 21 is a diagram schematically showing a cross section taken along E-E line in FIG. 19. As shown in FIG. 21, the laser part waveguide 41a has a structure in which a lower ad layer 51a formed as a portion of an n-InP substrate 50 projected from a surface of the substrate 50 by a projection height d3, an active core layer 52 having a GaInAsP multiple quantum well structure and configured to emit a light in a 1.55 µm band, and an upper clad layer 53 of p-InP are sequentially formed in this order on the n-InP substrate 50. On the upper ad layer 53, a contact layer 55 of GaInAsP and a p-side electrode 56 of Au/AuZn are formed in this order. Further, a passivation film 54 is formed so as to cover a surface of the support mesa parts 43a, 43b and a surface of the laser part waveguide 41a except for the portion of the p-side electrode 56. A pad electrode 57 of Ti/Pt/Au is formed to cover a part of the surface of the support mesa part 43b and a surface of the p-side electrode 56 on the laser part waveguide 41a. Further, an n-side electrode 58 of AuGeNi/Au is formed on a back surface of the substrate 50. The laser part waveguide 41b has a similar lamination structure to the laser part waveguide 41a.

Figure 22:
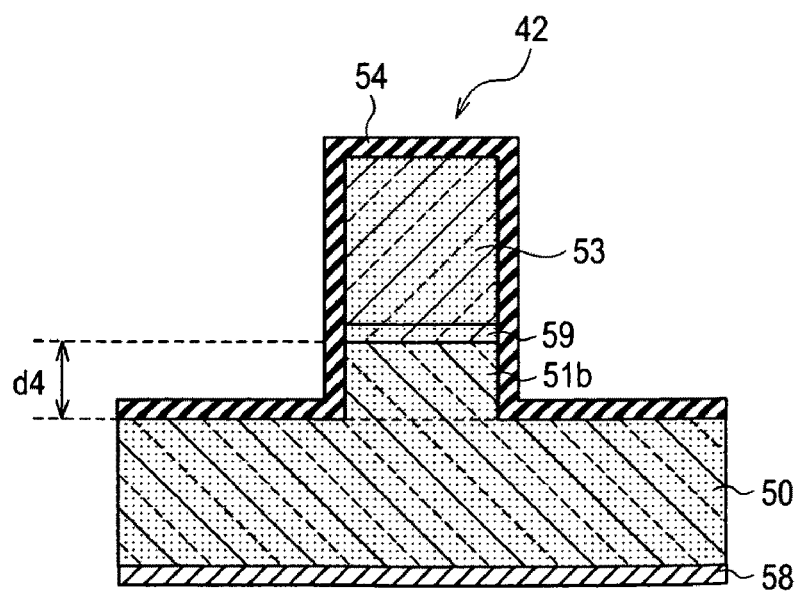
FIG. 22 is a schematic cross sectional view showing the bending waveguide integrated laser taken along F-F line in FIG. 19.

FIG. 22 is a diagram schematically showing a cross section taken along F-F line in FIG. 19. As shown in FIG. 22, the bending waveguide 42 has a structure in which a lower clad layer 51b formed as a portion of the substrate 50 projected from a surface of the substrate 50 by a projection height d4, a bulk core layer 59 of GaInAsP which is transparent in 1.55 µm band, and an upper clad layer 53 are sequentially formed in this order on the substrate 50. A passivation film 54 is formed to cover a surface of the bending waveguide 42. Further, an n-side electrode 58 is formed on a back surface of the substrate 50. The support mesa parts 43a, 43b have a similar lamination structure to the bending waveguide 42.

In the laser part waveguides 41a, 41b, a luminescence occurs in the active core layer 52 by supplying an electric current between the p-side electrode 56 and the n-side electrode 58 through the pad electrode 57. Average refractive indexes of the active core layer 52 and the bulk core layer 59 in a thickness direction are 3.31, and refractive indexes of the substrate 50, the lower clad layers 51a, 51b and the upper clad layer 53 are 3.17. A thickness of the upper clad layer 53 is 3.20 µm in the laser part waveguides 41a, 41b, and 2.50 µm in the bending waveguide. Further, thicknesses of the active core layer 52 and the bulk core layer 59 are 0.30 µm. A thickness of the contact layer 55 is 0.30 µm.

The projection height d3 of the lower clad layer 51a in the laser part waveguides 41a, 41b, which are straight waveguides, is 0.50 µm, while the projection height d4 of the lower clad layer 51b in the bending waveguide 42 is 1.50 µm.

Accordingly, like in the first embodiment, light propagation in higher order modes is restrained and the bending propagation loss of the light propagating in fundamental mode is sufficiently reduced.

Figure 23:
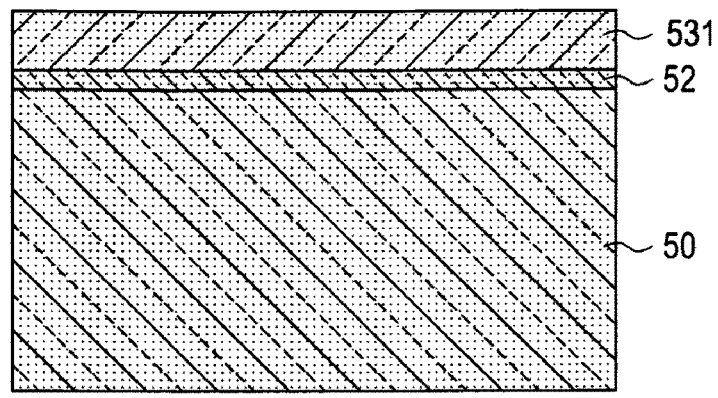
FIG. 23 is a schematic sectional view No. 1 showing a method of manufacturing the optical switch shown in FIG. 19.
Figure 24:
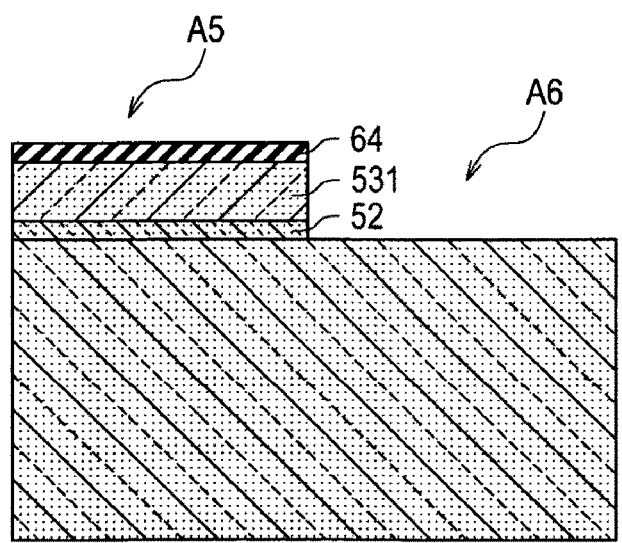
FIG. 24 is a schematic sectional view No. 2 showing the method of manufacturing the optical switch shown in FIG. 19.

A method of manufacturing the bending waveguide integrated laser 200 will be explained below with reference to FIGS. 23 to 31. FIGS. 23 to 27 show schematic cross sectional views taken along G-G line in FIG. 19. As shown in FIG. 23, an active core layer 52 and a part of an upper clad layer 531 of 0.90 µm in thickness are sequentially grown on an n-InP substrate 50 to form a lamination structure, using a crystal growth apparatus such as MOCVD apparatus. Then, a $SiN_x$ film is formed on an entire surface. A part of the $SiN_x$ film is removed by etching, leaving the film in a region in which the laser part waveguides 41a, 41b are to be formed as a mask 64, as shown in FIG. 24. Further, in a region where the $SiN_x$ is removed, the active core layer 52 and the part of the upper clad layer 531 are removed by etching. In FIG. 24, the region A5 designates the region in which a laser part waveguide 41a is to be formed, and the region A6 designates the region in which a bending waveguide 42 is to be formed.

Figure 25:
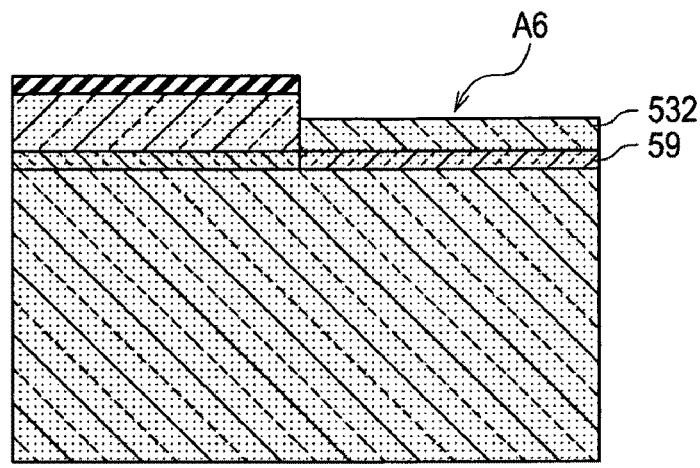
FIG. 25 is a schematic sectional view No. 3 showing the method of manufacturing the optical switch shown in FIG. 19.

Then, as shown in FIG. 25, a bulk core layer 59 and a part of an upper clad layer 532 of 0.20 µm in thickness are sequentially grown by butt joint crystal growth method, using the mask 64.

Figure 26:
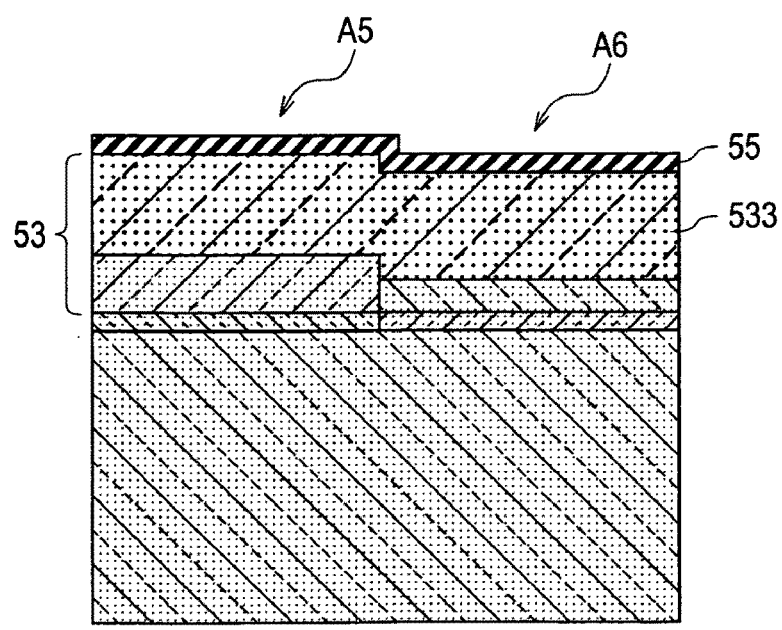
FIG. 26 is a schematic sectional view No. 4 showing the method of manufacturing the optical switch shown in FIG. 19.

Thereafter, as shown in FIG. 26, the mask 64 is removed by etching. The remaining part of the upper clad layer 533 is grown by 2.30 µm in thickness on the entire top surface, to form the upper clad layer 53. Further, a contact layer 55 of 0.30 µm in thickness is grown on the upper clad layer 53.

Figure 27:
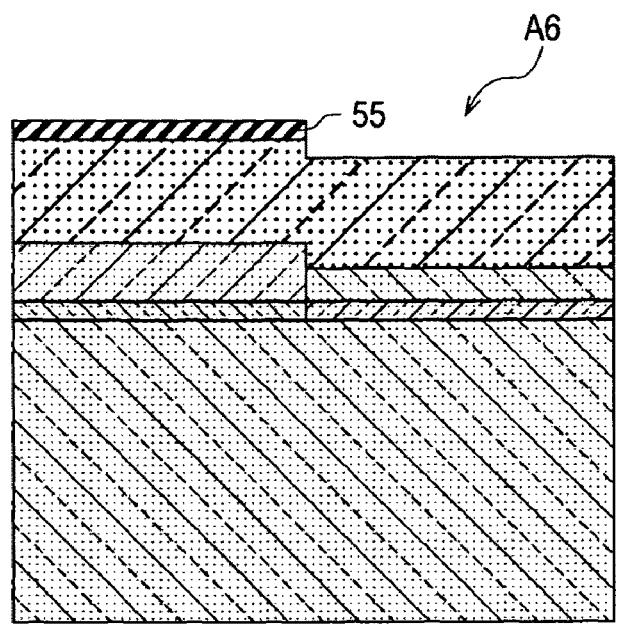
FIG. 27 is a schematic sectional view No. 5 showing the method of manufacturing the optical switch shown in FIG. 19.

Then, as shown in FIG. 27, a part of the contact layer 55 is removed by etching to leave the contact layer 55 in the region where the laser part waveguides 41a, 41b are to be formed.

Thereafter, a mask pattern of $SiN_x$ film is formed on the entire top surface. The mask pattern includes a waveguide mask pattern and a support mesa mask pattern. The waveguide mask pattern has the same shape as the laser part waveguides 41a, 41b and the bending waveguide 42 which are to be formed as shown in FIG. 20. The waveguide mask pattern has a straight part in a portion corresponding to the straight waveguide and a bending part in a portion corresponding to the bending waveguide. The support mesa mask pattern is formed in a region apart from the waveguide mask pattern on both lateral sides thereof, and has the same shape as the support mesa parts 43a, 43b to be formed.

Thereafter, the lamination structure is dry-etched over to the substrate 50 by reactive ion etching (RIE) method using chlorine gas, to form a mesa structure.

Figure 28:
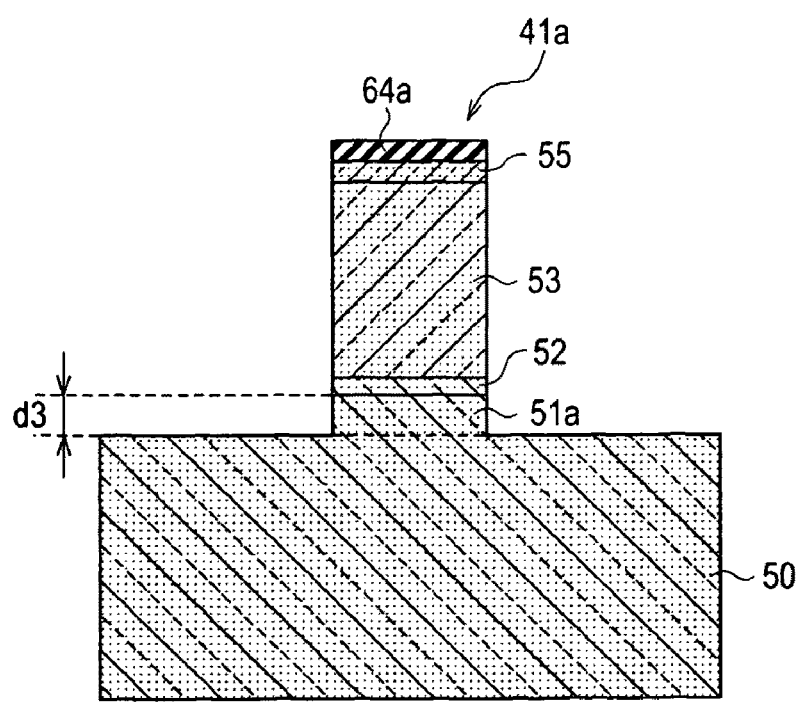
FIG. 28 is a schematic sectional view No. 6 showing the method of manufacturing the optical switch shown in FIG. 19.

FIG. 28 is a schematic cross section taken along E-E line after dry-etching. As shown in FIG. 28, a mesa structure is formed beneath the waveguide mask pattern 64a by the dry-etching. The mesa structure is to be a laser part waveguide 41a including a lower clad layer 51a formed as a portion of the substrate 50 projected by a projection height d3 of 0.50 µm, an active core layer 52, and an upper clad layer 53.

Figure 29:
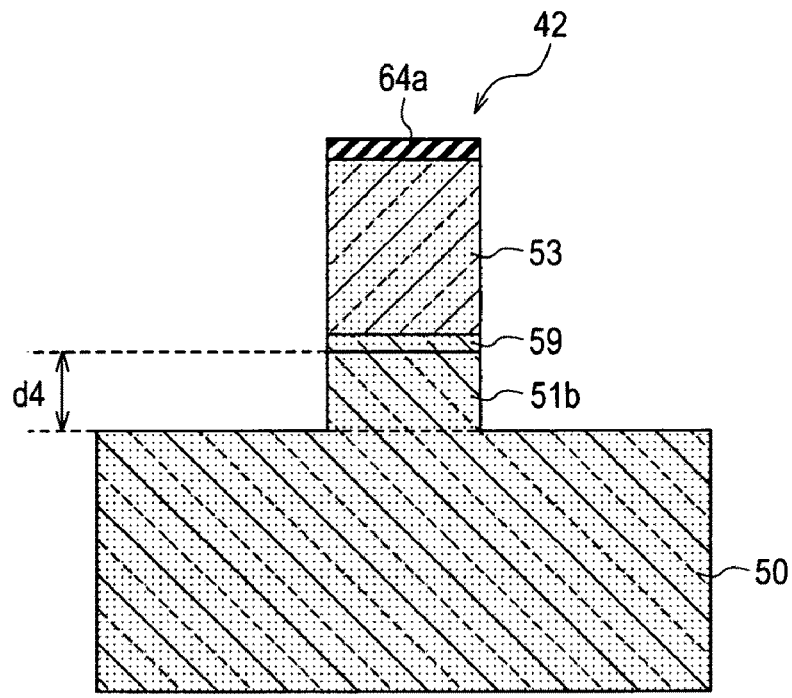
FIG. 29 is a schematic sectional view No. 7 showing the method of manufacturing the optical switch shown in FIG. 19.

FIG. 29 is a schematic cross section taken along F-F line after dry-etching. As shown in FIG. 29, a mesa structure is formed beneath the waveguide mask pattern 64a by the dry-etching. The mesa structure is to be a bending waveguide 42 including a lower clad layer 51b formed as a portion of the substrate 50 projected by a projection height d4 of 1.50 µm, a bulk core layer 59, and an upper clad layer 53. In this manufacturing method, since the thicknesses of the upper clad layer 53 are different between in the straight part and in the bending part, the same depth of etching causes different projection heights of the lower clad layer between in the straight part and in the bending part.

Figure 30:
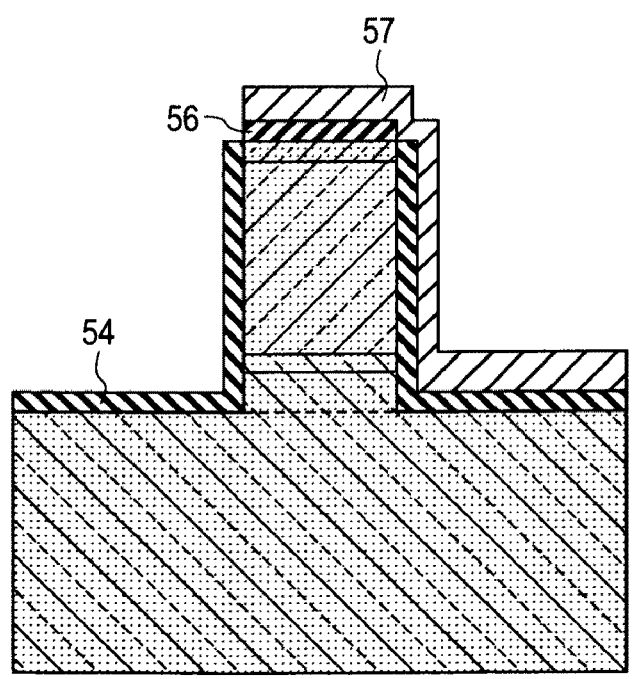
FIG. 30 is a schematic sectional view No. 8 showing the method of manufacturing the optical switch shown in FIG. 19.
Figure 31:
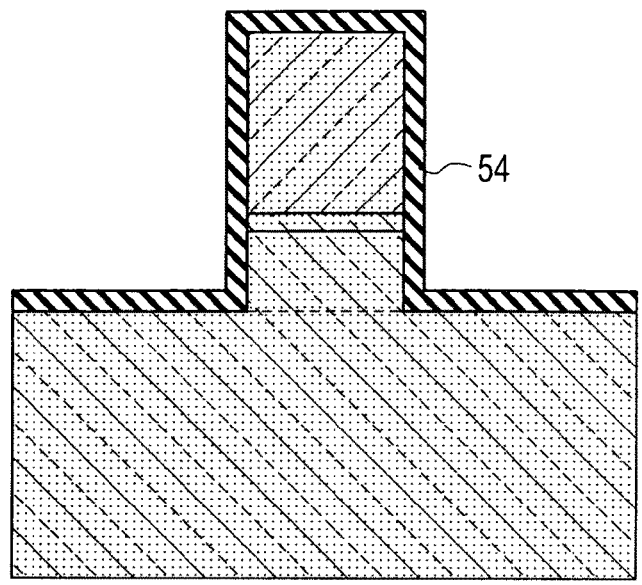
FIG. 31 is a schematic sectional view No. 9 showing the method of manufacturing the optical switch shown in FIG. 19.
Figure 32:
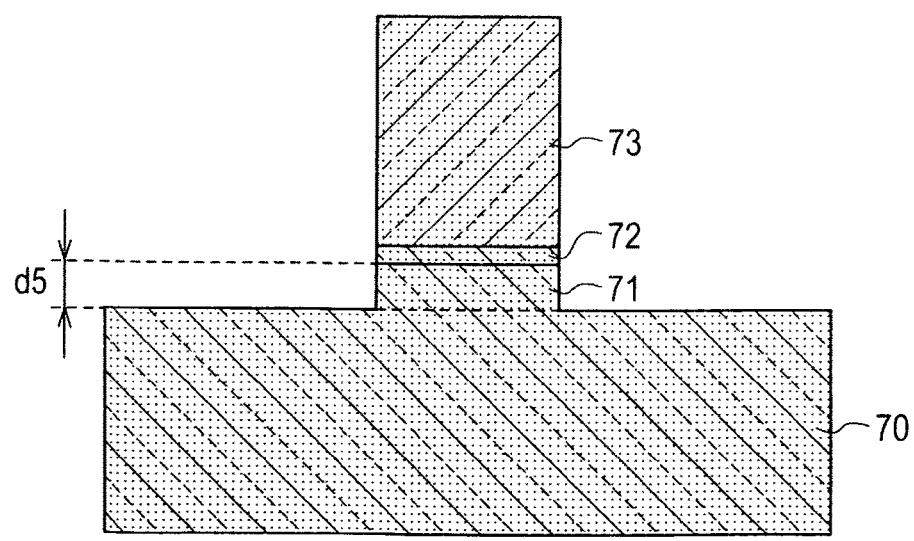
FIG. 32 is a schematic cross sectional view showing a structure of a conventional deep ridge waveguide.
Figure 33:
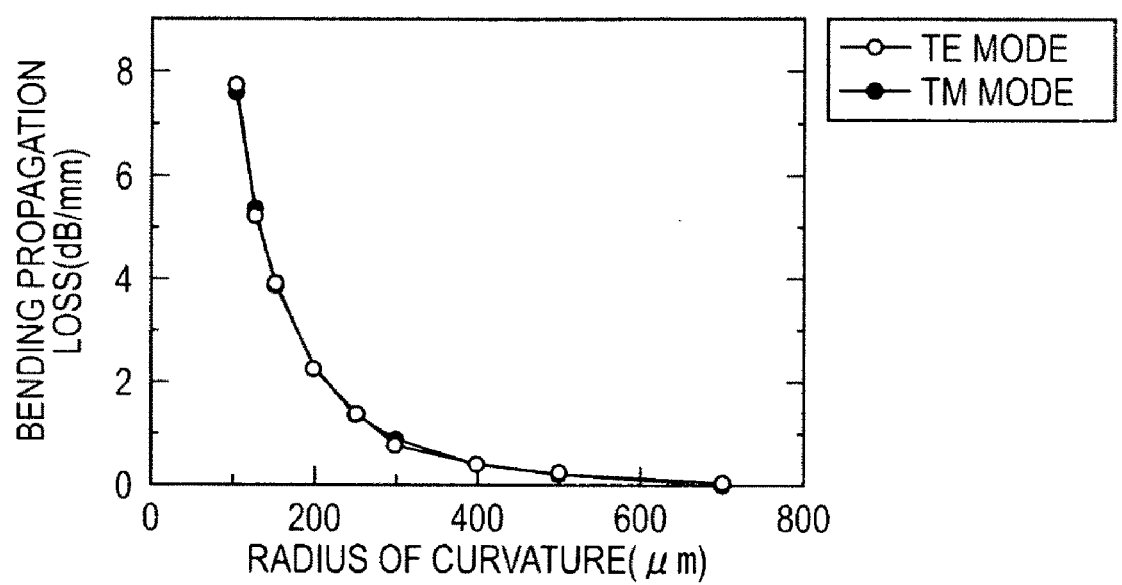
FIG. 33 is a graph showing calculation results of bending propagation loss as a function of a radius of a curvature in the conventional deep ridge waveguide.

Then, as shown in FIG. 30 and FIG. 31, like in the manufacturing method of the first embodiment, a passivation film 54, a p-side electrode 56, and a pad electrode 57 are formed. Further, an n-side electrode 58 is formed. Then, the lamination structure is cleaved to form an edge surface, on which a coating film 44 is formed. In this way, the bending waveguide integrated laser 200 is completed.

As a second example of the present invention, a bending waveguide integrated laser having a similar structure to the bending waveguide integrated laser 200 according to the second embodiment was fabricated. Further, as comparative examples, a bending optical integrated laser having a similar structure to the bending waveguide optical integrated laser 200 except for the projection height of the lower clad layer in all waveguides being constant at 0.50 µm (a third comparative example), and one except for the projection height of the lower clad layer in all waveguides being constant at 1.50 µm (a fourth comparative example) were fabricated. The bending optical integrated lasers were oscillated and the characteristics thereof were measured.

As a result, the bending waveguide optical integrated lasers of the second example and the third comparative example showed a far field pattern with single peak, while the bending optical integrated laser of the fourth example showed a far field pattern with plural peaks. This is considered to be because the bending optical integrated laser of the fourth example does not have good single mode characteristics and oscillates in higher order lateral modes.

As for the threshold current, the bending waveguide integrated lasers of the second example and the fourth comparative example showed a good value of 15 mA, while the bending waveguide integrated laser of the third comparative example showed a high value of 20 mA. This is considered to be because the bending waveguide integrated laser of the third example is subject to a large bending propagation loss of fundamental mode in the bending waveguide, which leads to a larger insertion loss.

As described above, it was confirmed that in the bending waveguide integrated laser of the second example, a light propagation in higher order modes is restrained and therefore the far field pattern shows a single peak. Further, the bending propagation loss is small and therefore the threshold current is small.

If the coating film 44 in the bending waveguide integrated laser according to the above-described second embodiment is replaced with an AR (anti-reflection) coating, a bending waveguide integrated optical amplifier, in which a light input from an edge surface of the laser part waveguide 41a is amplified in the laser part waveguides 41a, 41b and output from an edge surface of the laser part waveguide 41b, can be realized.

As described above, according to the present invention, an optical integrated device in which a bending propagation loss of fundamental mode in a deep ridge waveguide is restrained can be realized.

Although the invention has been described with respect to the specific embodiments for complete and clear disclosure, the appended claims are not to be thus limited but are to be construed as embodying all modification and alternative construction that may occur to one skilled in the art that fairly fall within the basic teaching herein set forth.

What is claimed is:

1. An optical integrated device comprising:
   a substrate; and
   a waveguide formed on a surface of the substrate, said waveguide including a lower clad layer, a core layer formed on the lower clad layer and having a refractive index greater than that of the lower clad layer, and an upper clad layer formed on the core layer and having a refractive index smaller than that of the core layer, said waveguide further including a straight waveguide part and a bending waveguide part curved in a plane parallel to the surface of the substrate, wherein said lower clad layer in the bending waveguide part projects from the substrate by a projection height greater than that of the lower clad layer in the straight waveguide part.

2. The optical integrated device according to claim 1, wherein said lower clad layer in the bending waveguide part projects from the substrate by the projection height greater than that of the lower clad layer in the straight waveguide part by a difference $\Delta d$ expressed by the following equation:

$$\Delta d \geq 0.13 \lambda / (n_{eff}^2 - n_{clad}^2)^{1/2}$$

where $\lambda$ is an operation wavelength of the optical integrated device, $n_{eff}$ is an effective refractive index of a slab waveguide equivalent to a lamination structure formed of the lower clad layer, the core layer, and the upper clad layer at the operation wavelength, and $n_{clad}$ is a refractive index of the lower clad layer at the operation wavelength.

3. The optical integrated device according to claim 1, wherein said bending waveguide part has a radius of a curvature not greater than 250 µm, said lower clad layer in the bending waveguide part projecting by the projection height of not less than 0.90 µm.

4. The optical integrated device according to claim 1, wherein said bending waveguide part has a radius of a curvature not greater than 125 µm, said lower clad layer in the bending waveguide part projecting by the projection height of not less than 1.20 µm.

5. The optical integrated device according to claim 1, further comprising a support mesa part having a mesa structure projecting from the surface of the substrate in a region apart from the waveguide on both lateral sides thereof, said support mesa part begin away from the bending waveguide part bay a distance larger than that of the support mesa part away from the straight waveguide part.

6. The optical integrated device according to claim 5, wherein said support mesa part is away from the straight waveguide part be the distance not greater than 4 µm.

* * * * *